United States Patent [19]
Stansberry et al.

[11] Patent Number: 5,617,323
[45] Date of Patent: Apr. 1, 1997

[54] KEY IDENTIFIER METHOD AND APPARATUS

[76] Inventors: Warren W. Stansberry, 8421 W. Foothill Dr., Peoria, Ariz. 85382; Bradley D. Carlson, 4115 W. Meadow Dr., Glendale, Ariz. 85308; Jeffrey C. Heidel, 5110 W. Caribbean La., Glendale, Ariz. 85306

[21] Appl. No.: 551,164

[22] Filed: Oct. 31, 1995

[51] Int. Cl.⁶ .................................. G06F 19/00
[52] U.S. Cl. ........................ 364/474.03; 235/375
[58] Field of Search ............... 364/474.03; 235/375

[56] References Cited

U.S. PATENT DOCUMENTS

| | | |
|---|---|---|
| 3,172,969 | 3/1965 | Haggstrom . |
| 3,870,895 | 3/1975 | Lax et al. . |
| 4,143,582 | 3/1979 | Heimann ........................... 364/474.03 |
| 4,233,746 | 11/1980 | Troillet . |
| 4,679,331 | 7/1987 | Koontz . |
| 4,853,866 | 8/1989 | Andrada Galan . |
| 4,868,559 | 9/1989 | Pinnow . |
| 4,969,782 | 11/1990 | Castain . |
| 5,127,532 | 7/1992 | Cimino et al. . |
| 5,144,561 | 9/1992 | Soper . |
| 5,351,409 | 10/1994 | Heredia . |

FOREIGN PATENT DOCUMENTS 61-10702   1/1986   Japan .

*Primary Examiner*—Harold Pitts
*Attorney, Agent, or Firm*—Cahill, Sutton & Thomas

[57] ABSTRACT

An electronic key identifier includes first and second opposing surface segment sensors which can be clamped into engagement with the opposite sides of the blade of an unknown key blank. Each side of the key blade includes collinear surface segments separated by one or more recessed segments. Electrical conductors within the surface segment sensors contact the raised surface segments and discharge electrical energy through the grounded key blade. Appropriate electronic circuitry interfaces the conductor of the surface segment sensor with a computer to generate an electronic image of the two key blade sides. By comparing the electrical image of the unknown key blade with a database of electrical images of known key blades, the unknown key can be identified to allow the operator of a key cutting machine to quickly complete the key identification process.

23 Claims, 5 Drawing Sheets

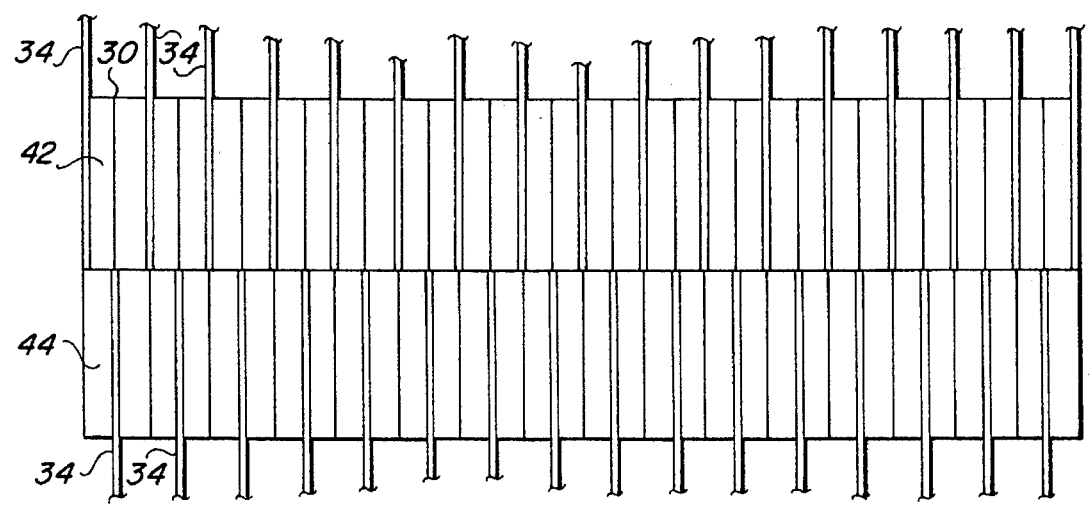
FIG-4B
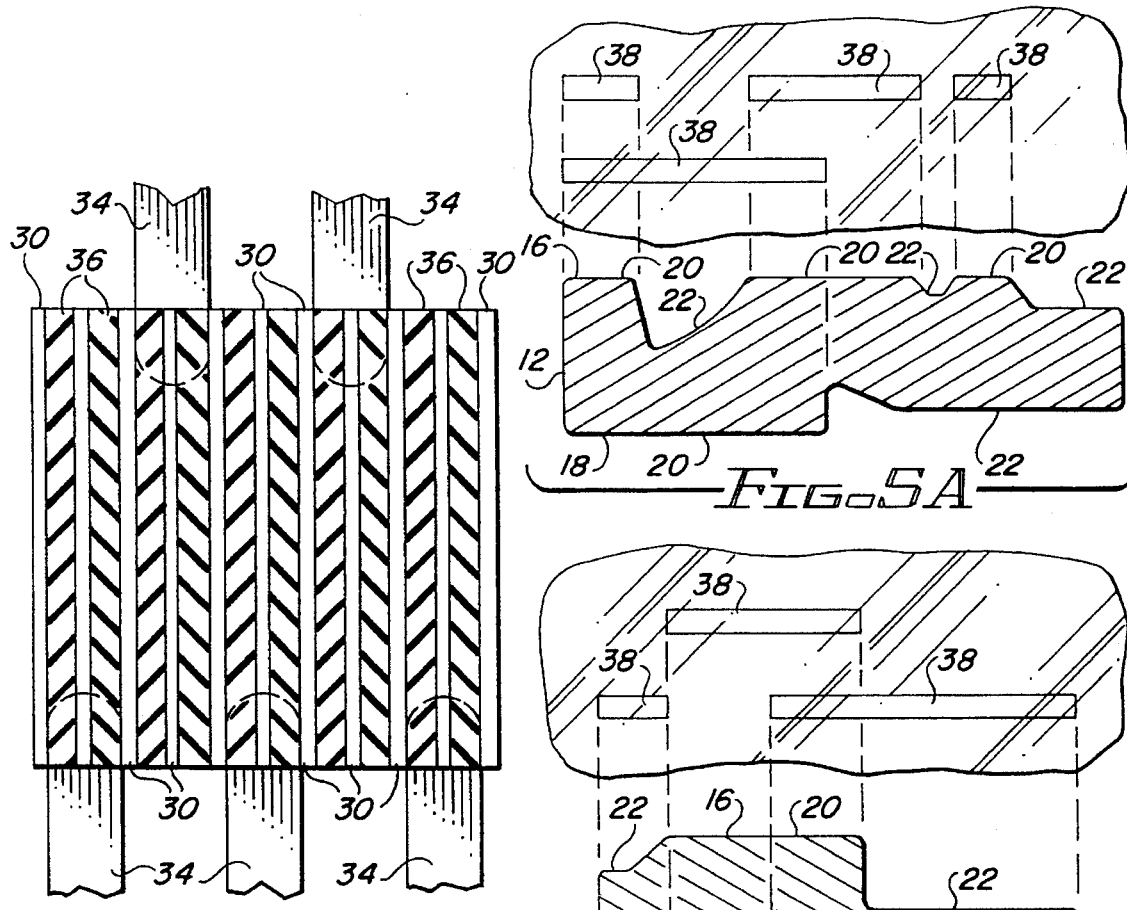
FIG-4A
FIG-5A
FIG-5B

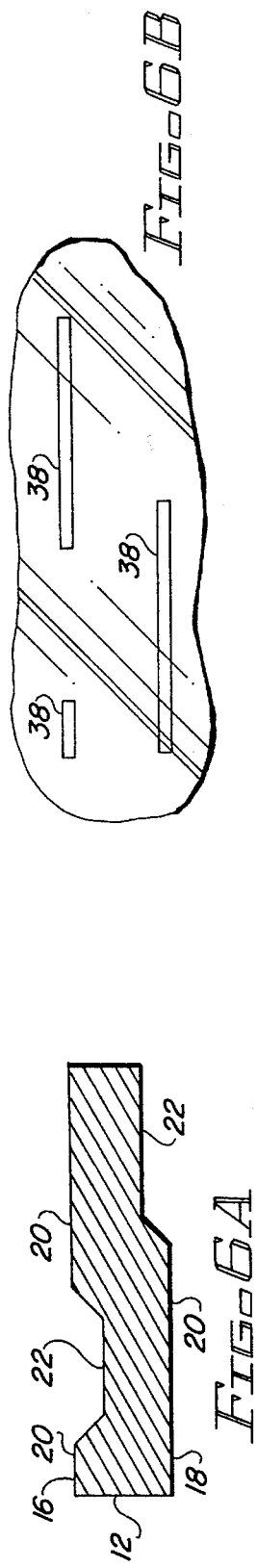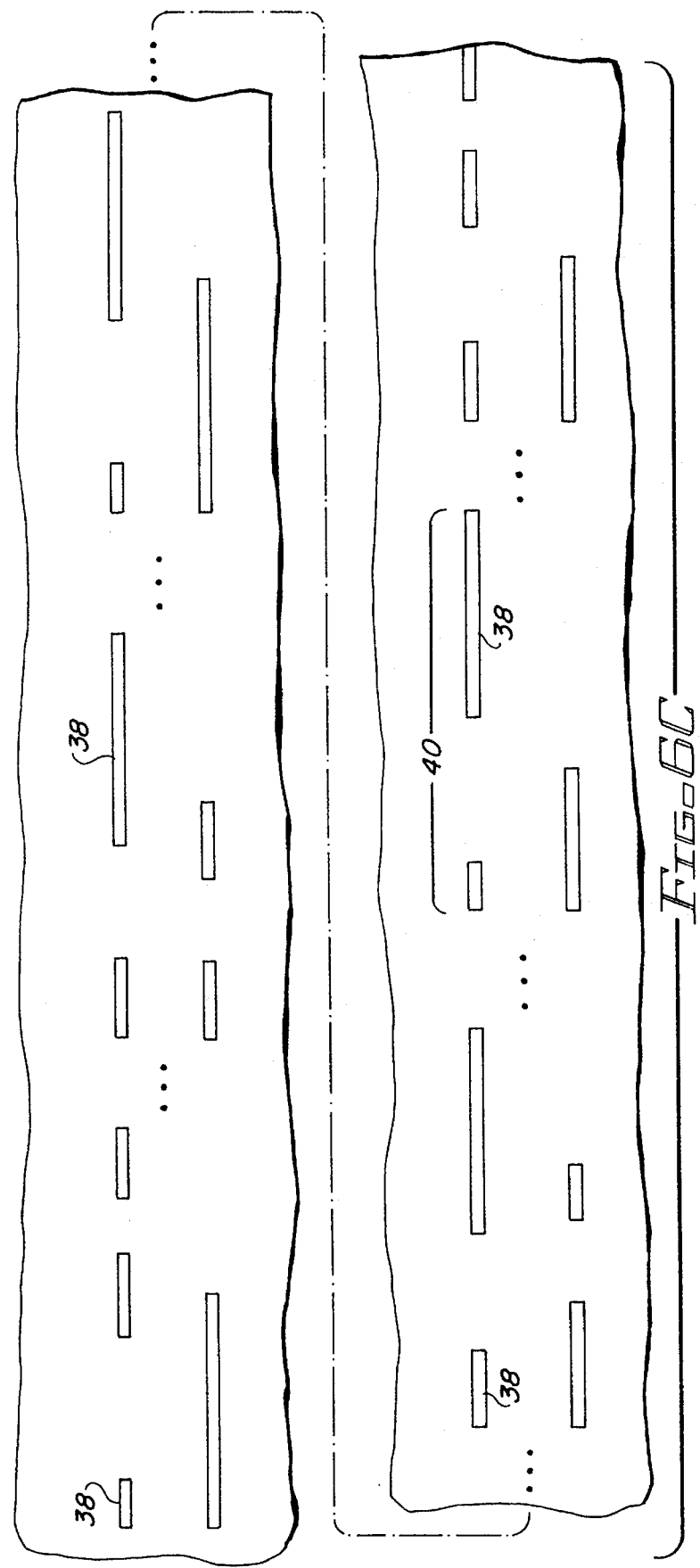

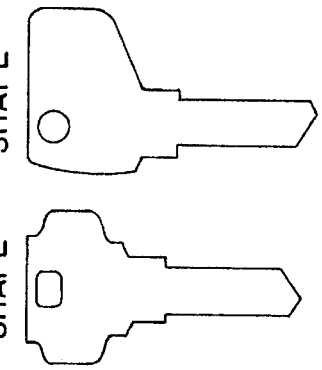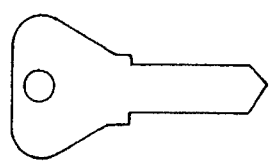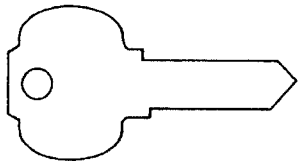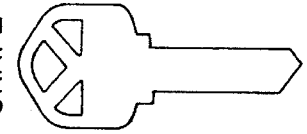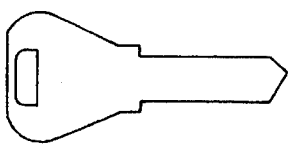
FIG. 7

KEY IDENTIFIER METHOD AND APPARATUS

BACKGROUND OF THE INVENTION

1. Field of the Invention

This invention relates to key identifier systems, and more particularly to systems for utilizing electronic means for identifying a key blank functionally compatible with an unknown key for use in key duplicating operations.

2. Description of the Prior Art

U.S. Pat. No. 5,531,409 (Heredia) discloses a mechanical key identifier to perform a sequentially-related series of tasks which ultimately allows an operator to select a key blank functionally compatible with an unknown key. While this prior art system can be fabricated at a relatively low cost and is highly reliable, it requires at least a limited amount of operator training and a meaningful amount of time both on the part of the key cutting machine operator as well as on the part of the customer.

SUMMARY OF THE INVENTION

It is therefore a primary object of the present invention to provide a key identifier method and apparatus which can automatically identify an unknown key and select a functionally compatible key blank within a matter of seconds and with absolute accuracy.

Another object of the present invention is to provide a key identifier method and apparatus which is physically small, relatively inexpensive and highly reliable.

Yet another object of the present invention is to provide a key identifier method and apparatus which can evaluate the geometry of the sides of the key blade of an unknown key with a resolution on the order of 0.005 inches to provide highly accurate analysis of the geometry of the blade of an unknown key.

Yet another object of the present invention is to provide a key identifier method and apparatus which includes an electronic database of electronic images of the geometry of unknown key blanks which can readily be undated and expanded.

Briefly stated, and in accord with one embodiment of the invention, an electronic key identifier is capable of selecting a key blank functionally compatible with an unknown key having a key blade formed from an electrically conductive material. A key blade extends along a longitudinal axis and includes first and second parallel, spaced-apart side surfaces where each side surface is defined by one or more collinear surface segments. Each surface segment includes a defined length and a defined position relative to the longitudinal axis. Each side surface of the key blade further includes one or more recessed segments offset from the side surfaces and separating adjacent surface segments.

The electronic key identifier includes a first surface segment sensor having a flat sensor surface. The sensor surface includes a series of parallel, spaced-apart electrical conductors which contact the surface segments lying on the first side of the key blade. By providing a path of electrical conductivity between the electrical conductor and ground, a flow of current is directed through each sensor conductor in contact with each surface segment.

A second surface segment sensor also includes a flat sensor surface having a series of parallel, spaced-apart electrical conductors which contact the surface segments lying on the second side of the key blank. In a similar manner, a flow of electrical current is directed through each sensor conductor in contact with each surface segment.

Image generating means identifies the electrical conductors in the first and second surface segment sensors through which current is flowing and converts these identified electrical conductors into an electronic image of the first and second sides of the key blade.

Image matching means includes a database of electronic images of the first and second sides of known key blades and is capable of matching the electronic image of the key blade of the unknown key with the electronic image of one or of a group of known key blanks.

DESCRIPTION OF THE DRAWINGS

The invention is pointed out with particularity in the appended claims. However, other objects and advantages together with the operation of the invention may be better understood by reference to the following detailed description taken in connection with the following illustrations, wherein:

FIG. 4A represents an enlarged elevational view of a single surface segment sensor.

FIG. 4B represents an enlarged elevational view of a pair of surface segment sensors to provide enhanced resolution.

FIG. 5A illustrates a sectional view of an unknown key blade together with the representative key blade electronic images.

FIG. 5B illustrates a sectional view of a second unknown key blade configuration and the different electronic images relating to that different key blade configuration.

FIG. 6A illustrates a third unknown key blank cross sectional configuration.

FIG. 6B illustrates the electronic images corresponding to the two sides of the key blade cross section depicted in FIG. 6A.

FIG. 6C illustrates database searching operations for the purpose of identifying a correspondence between the FIG. 6B electronic image and a stored electronic image corresponding to a known key blank blade configuration.

FIG. 7 illustrates a computer cathode ray tube display of a group of known key blank shapes for allowing a system operator to perform the final selection or matching step between the shape of the unknown key and a specific known key blank within the displaced group.

DESCRIPTION OF THE PREFERRED EMBODIMENT

Figure 1A:
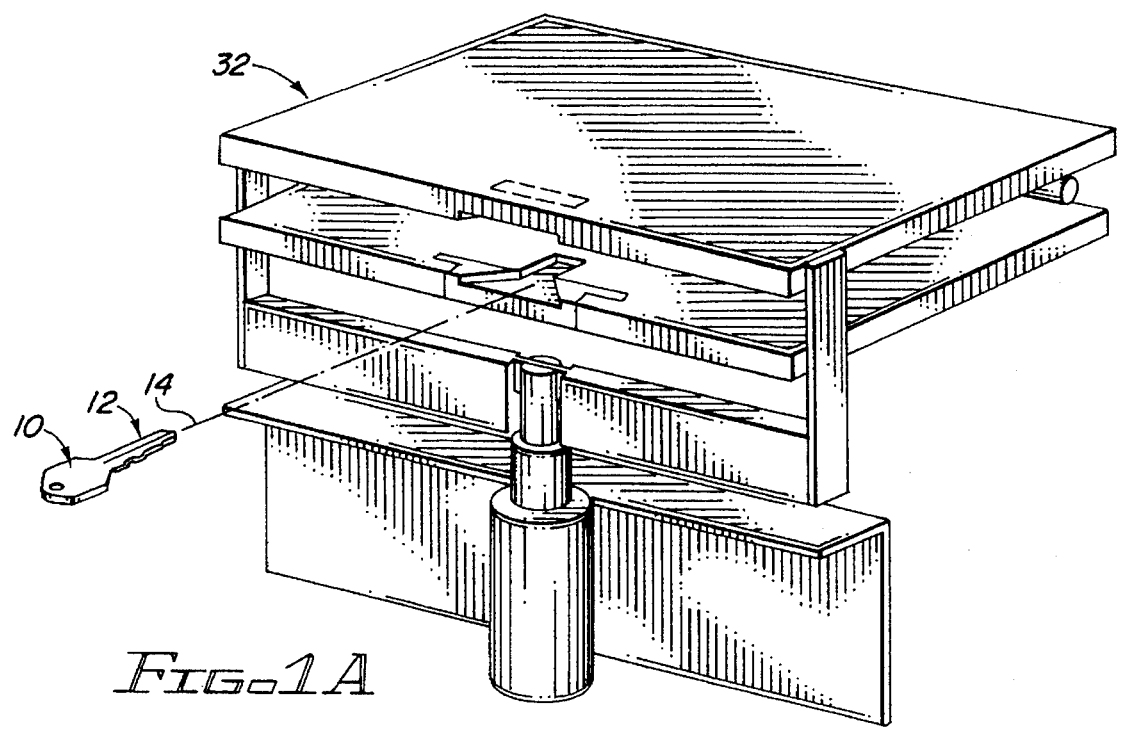
FIG. 1A illustrates a perspective view of the key retaining fixture of the electronic key identifier shown in the "open" or key loading position.

In order to better illustrate the advantages of the invention and its contributions to the art, a preferred hardware embodiment of the invention will now be described in detail.

Referring to FIGS. 1A, 1B, 2, 3A and 3B, an unknown key 10 includes a key blade 12 formed from an electrically conductive material such as brass. Key blade 12 extends along a longitudinal axis 14 and includes first and second parallel, spaced-apart side surfaces 16 and 18. Each side surface 16, 18 is defined by one or more collinear surface segments 20 each having a defined length and a defined position relative to longitudinal axis 14.

Each side surface 16, 18 also includes one or more recessed segments 22 offset from side surfaces 16, 18. Recessed segments 22 separate adjacent surface segments 20.

Referring now to FIGS. 2, 3, 4 and 5, the electronic key identifier of the present invention includes first and second surface segment sensors 24 and 26 each of which includes a flat sensor surface 28. Each surface segment sensor 24, 26 includes a series of parallel, spaced-apart electrical conductors 30 extending at equal, spaced-apart intervals across the full width of each segment sensor. In the preferred embodiment of the invention, an elastomeric connector manufactured by Advanced Connector Technology (0.640×0.190× 0.138 AD50) has been found to work in a highly satisfactory manner. Connectors of this type are frequently used in watches and computers to interconnect a liquid crystal display with related electronic circuitry. In the preferred embodiment of the invention illustrated in FIG. 2, a spacing of 0.10 inches is provided between adjacent electrical conductors. Adjacent conductors 30 are separated by an elastomeric, silicon-based material which serves as a resilient electrical insulator.

Figure 1B:
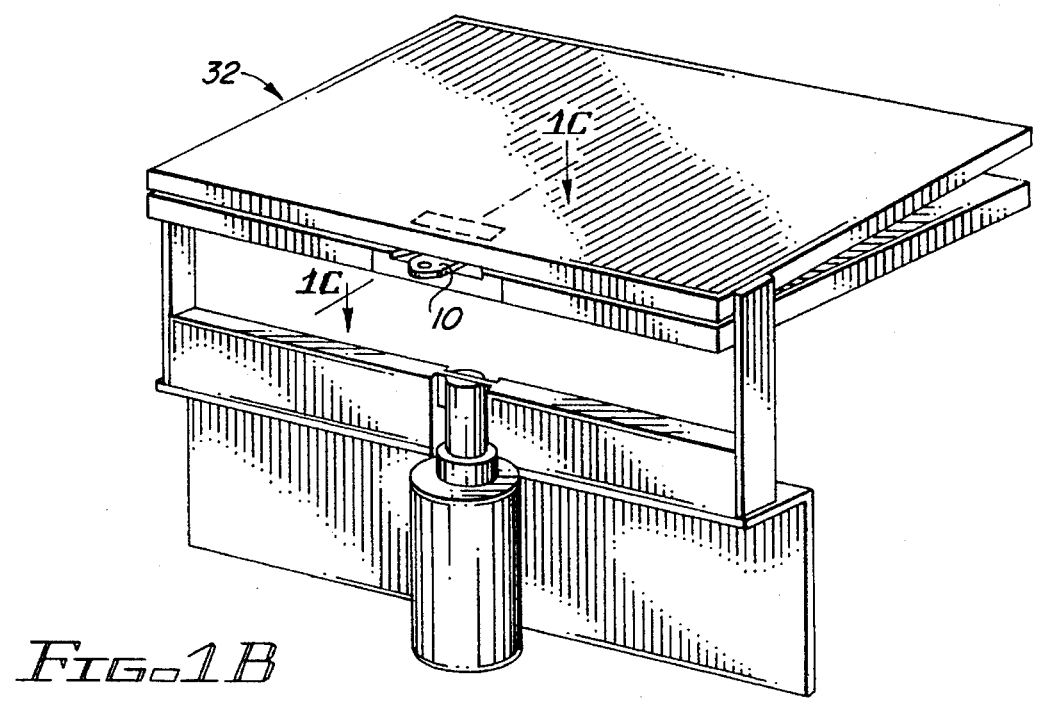
FIG. 1B illustrates a perspective view of the key retaining fixture of the electronic key identifier shown in the "closed" or key identification position.
Figure 1C:
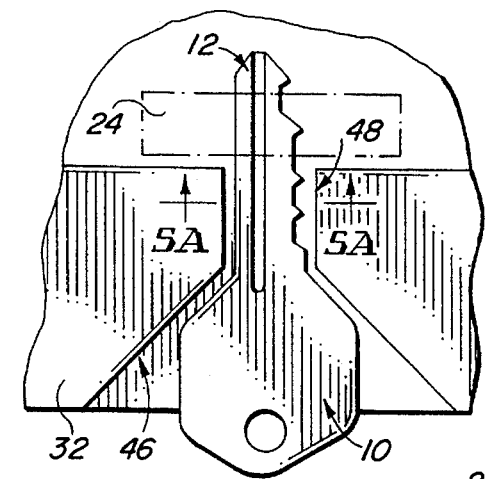
FIG. 1C represents an enlarged sectional view of the key retaining fixture illustrated in FIG. 1B taken along section lines 1C—1C.
Figure 2:
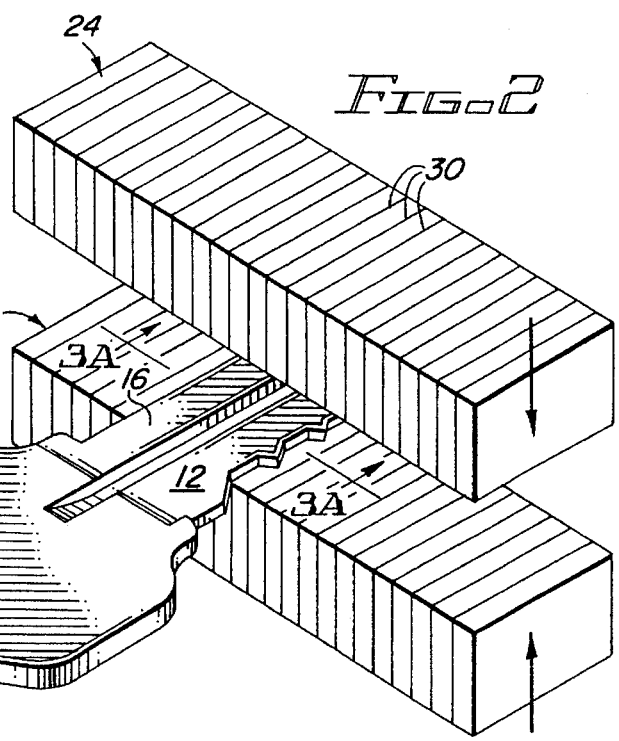
FIG. 2 illustrates an enlarged perspective view of an unknown key blank inserted between first and second surface segment sensors.
Figure 3A:
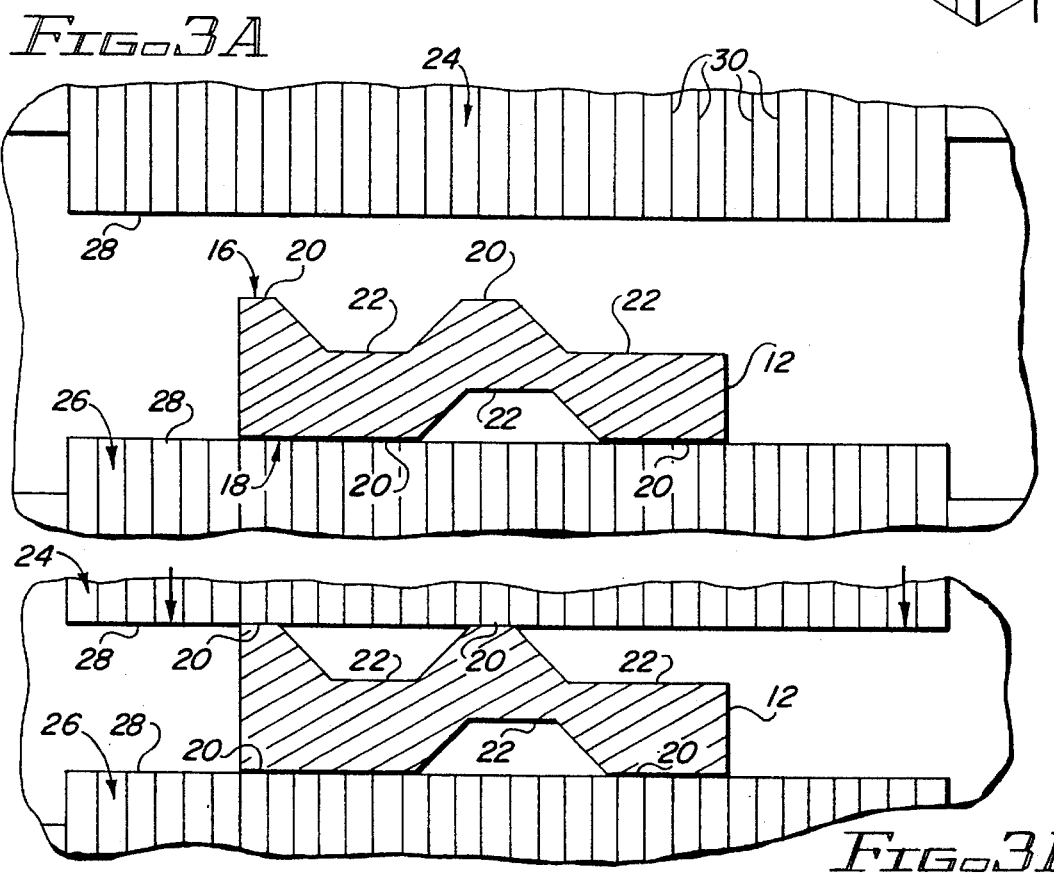
FIG. 3A represents a partially cutaway elevational view of the structure illustrated in FIG. 2, taken along section line 3A—3A.
Figure 3B:
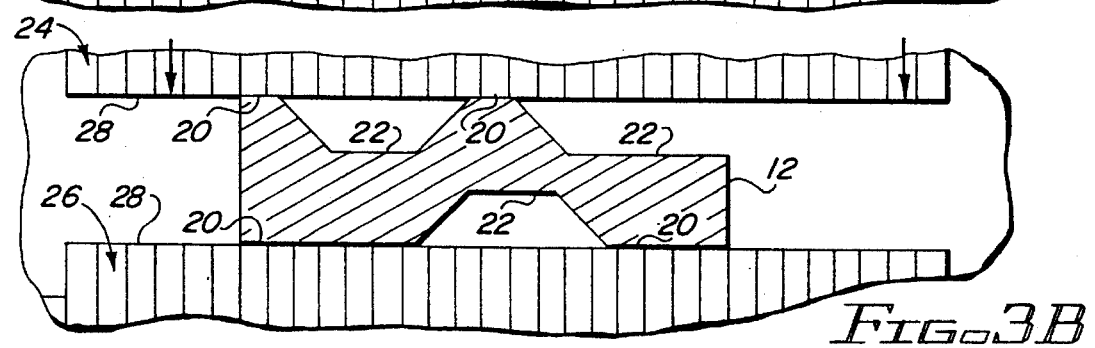
FIG. 3B illustrates the key and first and second sensor segments illustrated in FIG. 3A with the key retaining fixture displayed into the "closed" or key identification configuration.

As illustrated in FIGS. 2 and 3, when key retaining fixture 32 as illustrated in FIG. 1 is moved from the "loading" position illustrated in FIGS. 1A, 2 and 3A into the "closed" or key identification position shown in FIGS. 1B and 3B, sensor surfaces 28 and electrical conductors 30 are brought into physical and electrical contact with surface segments 20 of sides 16, 18 of key blade 12 but are not brought into either physical or electrical contact with recessed segments 22.

FIG. 4A illustrates how surface segment sensors 24, 26 are electrically interfaced with the conductors 34 of an adjacent printed circuit board. As illustrated in FIG. 4A, printed circuit board conductors 34 are spaced apart by 0.01 inches to interface with conductors 30 which are spaced apart by a distance of 0.002 inches. The intervening insulating material 36 is clearly illustrated in FIG. 4A.

In one embodiment of the invention, a fixed voltage such as five volts is applied to each conductor 34 so that as illustrated in FIG. 3B, establishing physical contact between conductors 30 of surface segment sensors 24, 26 and surface segments 20 of the electrically grounded key blade 12 will direct a flow of electrical current through each sensor conductor 30 in contact with each surface segment 20.

FIGS. 5A and 5B illustrate how using techniques well known to those of ordinary skill in the art, a flow of electrical current through designated conductors 30 can be electrically converted into pixels or data as illustrated by rectangular image segments 38 in FIGS. 5A and 5B. Such data essentially generates an electronic image designating the length and position of each surface segment 20 of the blade 12 of an unknown key. In FIGS. 5A and 5B, the vertically oriented dotted lines illustrate the relationship between electronic segments 38 and the mechanical configuration of surface segments 20 of the unknown key. The gaps between adjacent electronic segments 38 essentially define the length and position of recessed segments 22.

The electronic image segments 38 illustrated above key blade 12 in FIG. 5A demonstrate the correspondence between that electronic image of the first and second sides 16, 18 of key blade 12 and the mechanical structure of that key blade. Similar representations appear in FIG. 5B and in FIGS. 6A/6B.

FIG. 6C illustrates the sequential electronic key identification process of the present invention. FIG. 6A illustrates the cross sectional geometry of the surface segments 20 and the recessed segments 22 of blade 12 of an unknown key. FIG. 6B illustrates the electronic image corresponding to the key blade illustrated in FIG. 6A. FIG. 6C symbolically represents a comprehensive database of electronic images of the first and second sides of a variety of key blades corresponding to known key designs. Using programming techniques well known to those of ordinary skill in the art, computer software is prepared to implement the image matching process illustrated in FIG. 6. Using such data processing techniques, the image of the unknown key blade illustrated in FIG. 6B is electronically matched with corresponding known image 40 as shown in FIG. 6C. Data corresponding to that matched key blank can then be displayed to an operator through a variety of well known computer-based display means such as a cathode ray tube, a digital readout or similar mechanisms.

In certain instances, identification of a one to one corresponding between the geometry of an unknown key blade and the image of a known key blade will provide a certain degree of ambiguity as illustrated in FIG. 7. In certain unique situations, a single key blade geometry may appear on a significant variety of unknown keys having a variety of unknown key shapes as illustrated in FIG. 7. In the example shown, nine different unknown key shapes may correspond to three different functionally compatible (although geometrically dissimilar) key blanks. As illustrated in FIG. 7, a single identified key blade side surface geometry corresponds to nine different key styles and to potentially compatible key blank numbers 66, 67 and 70.

When implementation of the electronic key identification process of the present invention results in the identification of a group of known key blanks as illustrated in FIG. 7 rather than a single key blank, an additional step is required. When group matching occurs, as illustrated in FIG. 7, the computer cathode ray tube will display an image substantially as illustrated in FIG. 7 to allow the operator to visually match the shape of the unknown key sought to be duplicated with the shape of a limited number of potential key blank candidates. Once a one to one correspondence between the shape of the unknown key blank and the shape of a depicted key blank has been obtained, the operator is immediately able to determine the number of or other identifier for a single functionally compatible (although not necessarily geometrically identical) key blank. Utilization of that functionally compatible key blank will allow the operator to successfully duplicate the bit notch pattern of the unknown key on that functionally compatible key blank and will allow the customer to obtain a key which will be functionally compatible with the customer's lock.

In certain instances, it may be desirable to enhance the resolution of data relating to the length and position of surface segments 20 of the unknown key to provide for enhanced computer-based matching. As illustrated in FIG. 4B, a two-fold resolution enhancement can be achieved by forming a single surface segment sensor 24 from a pair of sensor elements 42 and 44. In the FIG. 4B embodiment of the invention, the resolution is increased by a factor of two from 0.10 inches as available with the FIG. 4A embodiment to a resolution of 0.005 inches as illustrated in FIGS. 4B.

As illustrated in FIG. 1C, key retaining fixture 32 includes a key receiving receptacle 46 including funnel-shaped side surfaces and a narrow keyway 48 which assists in obtaining appropriate longitudinal alignment of key 10 such that longitudinal axis 14 of key 10 is oriented approximately parallel to the orientation of conductors 30 of surface segment sensors 24, 26.

While the electronic key identifier of the present invention has been disclosed as utilizing a surface segment sensor having a plurality of electrical conductors 30 which physically contact raised surface segments 20 of an unknown key, a capacitor or other equivalent surface proximity sensing means could be utilized to sense the proximity of the surface segments 20 to the surface segment sensors and the spaced apart relationship between the sensors and recessed segments 22. Accordingly, it is intended by the appended claims to cover all such modifications of the invention which fall within the true spirit and scope of the invention.

I claim:

1. An electronic key identifier for selecting a key blank functionally compatible with an unknown key having a key blade formed from an electrically conductive material, extending along a longitudinal axis and including first and second parallel, spaced-apart side surfaces, where each side surface is defined by one or more collinear surface segments each having a defined length and a defined position relative to the longitudinal axis, each side surface further including one or more recessed segments offset from the side surfaces and separating and adjacent surface segments, the key identifier comprising:

a. a first surface segment sensor having a flat surface sensor surface including a series of parallel, spaced-apart electrical conductors for contacting the surface segments lying on the first side of the key blade and for directing a flow of current through each sensor conductor in contact with each surface segment;

b. a second segment surface segment sensor having a flat sensor surface including a series of parallel, spaced-apart electrical conductors for contacting the surface segments lying on the second side of the key blade and for directing a flow of current through each sensor conductor in contact with each surface segment;

c. image generating means for identifying the electrical conductors in the first and second surface segment sensors through which current is flowing and for converting those identified electrical conductors into an electronic image of the first and second sides of the key blade; and d. image matching means including a database of electronic images of the first and second sides of key blades of the known key blanks and for matching the electronic image of the key blade of the unknown key with the electronic image of a known key bank.

2. The electronic key identifier of claim 1 wherein the electronic image defines the length and position of each surface segment.

3. The electronic key identifier of claim 1 further including key blank selector means for visually designating a specified key blank functionally compatible with the unknown key.

4. The electronic key identifier of claim 1 wherein the first and second surface segment sensors are oriented parallel to each other with the conductors aligned to parallel the longitudinal axis of the unknown key.

5. The electronic key identifier of claim 1 further including a key retaining fixture positionable into a key loading position for loading and aligning the unknown key blank and into a key identifying position for bringing the sensor surfaces of the first and second surface segment sensors into contact with the first and second side surfaces of the blade of the unknown key.

6. The electronic key identifier of claim 1 wherein adjacent electronic conductors of each surface segment sensor are spaced apart at equal intervals.

7. The electronic key identifier of claim 6 wherein the conductors of the surface segment sensor extend between a first side and a second side and wherein adjacent conductors interface with leads of a printed circuit board on alternating sides of each sensor with adjacent conductors laterally offset by a distance approximating one half of the interval between adjacent printed circuit boards leads.

8. The electronic key identifier of claim 1 wherein each surface segment sensor includes an insulating material between adjacent electrical conductors.

9. The electronic key identifier of claim 8 wherein the insulating material includes a resilient insulating material.

10. The electronic key identifier of claim 9 wherein the resilient insulating material includes a silicon-based material.

11. An electronic key identifier for selecting a key blank functionally compatible with an unknown key having a key blade formed from an electrically conductive material, extending along a longitudinal axis and including first and second parallel, spaced-apart side surfaces, where each side surface is defined by one or more collinear surface segments each having a defined length and a defined position relative to the longitudinal axis, each side surface further including one or more recessed segments offset from the side surfaces and separating and adjacent surface segments, the key identifier comprising:

a. a first surface segment sensor having a flat surface sensor surface including a series of parallel, spaced-apart electrical conductors for contacting the surface segments lying on the first side of the key blade and for directing a flow of current through each sensor conductor in contact with each surface segment;

b. a second segment surface segment sensor having a flat sensor surface including a series of parallel, spaced-apart electrical conductors for contacting the surface segments lying on the second side of the key blade and for directing a flow of current thorough each sensor conductor in contact with each surface segment;

c. image generating means for identifying the electrical conductors in the first and second surface segment sensors through which current is flowing and for converting those identified electrical conductors into an electronic image of the first and second sides of the key blade; and d. image matching means including a database of electronic images of the first and second sides of key blades of the known key blanks and for matching the electronic image of the key blade of the unknown key with the electronic image of a group of known key banks.

12. The electronic key identifier of claim 11 further including key blank selector means for visually designating a specified group of key blanks functionally compatible with the unknown key.

13. The electronic key identifier of claim 12 wherein the unknown key includes a shape and wherein the key blank selector means visually displays the shapes of the selected group of known key blanks to allow a system user to visually match the shape of the unknown key with a shape of one of the group of specified key blanks.

14. The electronic key identifier of claim 13 wherein the electronic image defines the length and position of each surface segment.

15. The electronic key identifier of claim 14 wherein the first and second surface segment sensors are oriented parallel to each other with the conductors aligned to parallel the longitudinal axis of the unknown key.

16. The electronic key identifier of claim 15 further including a key retaining fixture positionable into a key loading position for loading and aligning the unknown key blank and into a key identifying position for bringing the sensor surfaces of the first and second surface segment sensors into contact with the first and second side surfaces of the blade of the unknown key.

17. The electronic key identifier of claim 16 wherein the electronic conductors each surface segment sensor are spaced apart at equal intervals.

18. The electronic key identifier of claim 17 wherein the conductors of the surface segment sensor extend between a first side and a second side and wherein adjacent conductors interface with leads of a printed circuit board on alternating sides of each sensor with adjacent conductors laterally offset by a distance approximating one half of the interval between adjacent printed circuit boards leads.

19. The electronic key identifier of claim 18 wherein each surface segment sensor includes an insulating material between adjacent electrical conductors.

20. The electronic key identifier of claim 19 wherein the insulating material includes a resilient insulating material.

21. The electronic key identifier of claim 20 wherein the resilient insulating material includes a silicon-based material.

22. An method for electronically selecting a key blank functionally compatible with an unknown key having a key blade formed from an electrically conductive material, extending along a longitudinal axis and including first and second parallel, spaced-apart side surfaces, where each side surface is defined by one or more collinear surface segments each having a defined length and a defined position relative to the longitudinal axis, each side surface further including one or more recessed segments offset from the side surfaces and separating and adjacent surface segments, comprising the steps of:

a. contacting the surface segments lying on the first side of the key blade with a first surface segment sensor having a flat sensor surface and a series of parallel, spaced-apart electronic conductors and directing a flow of current through each sensor conductor in contact with each surface segment;

b. contacting the surface segments lying on the second side of the key blade with a second surface segment sensor having a flat sensor surface and a series of parallel, spaced-apart electronic conductors and directing a flow of current through each sensor conductor in contact with each surface segment;

c. identifying the electrical conductors in the first and second surface segment sensors through which current is flowing and converting those identified electrical conductors into an electronic image of the first and second sides of the key blade; and d. matching the electronic images of the key blade of the of the known key with the electronic image of a known key blank selected from a data base of electronic images of known key blades.

23. The method of claim 22 including the further step of visually designating a specified key blank functionally compatible with the unknown key.

* * * * *